Sept. 21, 1965   J. HILL   3,207,456

DRUMS, REELS OR THE LIKE

Filed Oct. 26, 1962   2 Sheets-Sheet 1

INVENTOR:
JOHN HILL

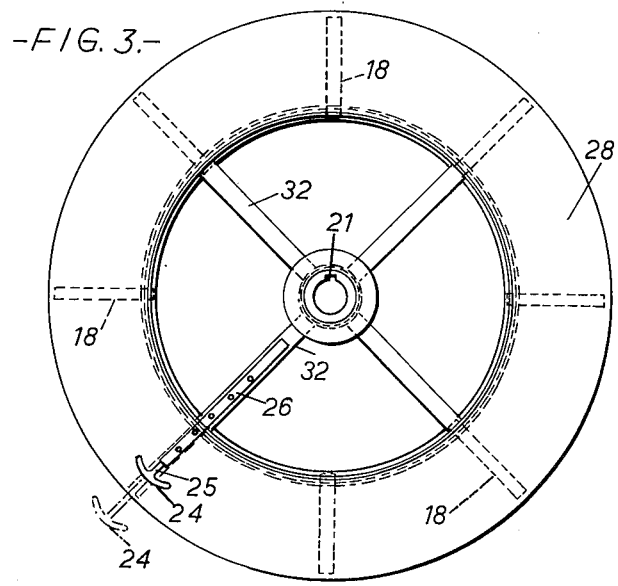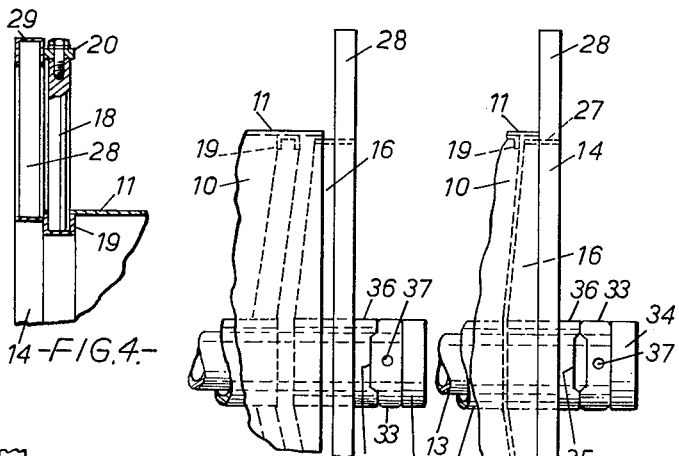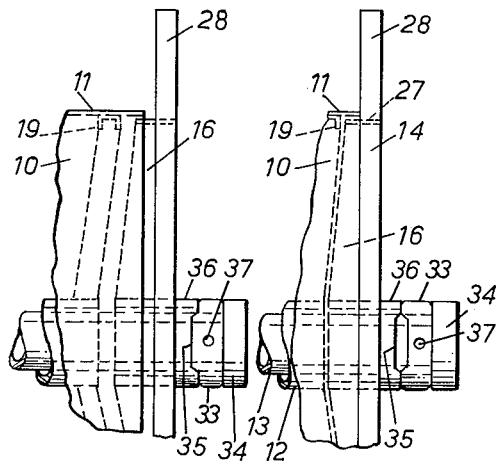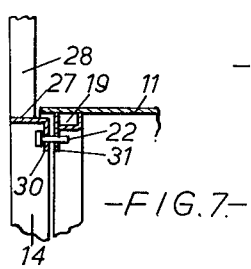

United States Patent Office 3,207,456
Patented Sept. 21, 1965

3,207,456
DRUMS, REELS OR THE LIKE
John Hill, "Walden," Parkfields Lane, Fearnhead, near Warrington, Lancaster, England
Filed Oct. 26, 1962, Ser. No. 233,389
2 Claims. (Cl. 242—94)

The present invention relates to cable or rope drums, reels or the like, and has for its primary object to facilitate the act of emptying reels, drums and the like at the site of use. Another object is to assist in performing essential processes in or on the drums.

Normally when a drum or reel loaded with a charge of cable, rope or wire is dispatched to the site of proposed use, it first has to be lifted off the ground on to jack stands, cradles or other specific holding devices to enable the drum to be revolved, clear of obstructions, so as to unwind the wire or cable.

According to the present invention a drum or reel has a centre or barrel for the reception of the cable, rope or wire, which centre or barrel is adapted for rotation relatively to the flanges or ends of the drum so as to permit unwinding of the cable, rope or wire without movement of said flanges or ends.

Thus the separately revolving centre or barrel of the drum can revolve whilst the remainder of the drum or reel is at rest such as by standing on its flanges, i.e. once the drum or reel is on the site of proposed use it merely remains for locking pins, sliding keys or the like devices to be removed or re-set and the flanges to be scotched to prevent rolling, whereupon on pulling the cable or wire the barrel will revolve and the charge will unwind as required.

The drum may be of any rigid material having the required strength. Thus it may be of metal or again of wood. The barrel may be constituted by a simple cylinder revolving on a cylindrical or tubular spindle or shaft of the drum or it may revolve on a central shaft or spindle of the drum in which event when it is made of metal it may be spoked. If desired it may have flanges fitted with interposed rollers, or alternatively the rollers may be interposed at the rim of the barrel.

Where the barrel is adapted to revolve on a central axle locking may be effected by sliding keys or by simple lugs and locking pins, it being appreciated that locking is desired during processing in order to render the drum as a whole a normal solid unit.

Where side pressure of the cable, wire or rope charge is likely to prevent easy rotation of the barrel for unloading purposes, the latter may be provided with side or end members or with inset side rollers. Alternatively, at the site of unwinding of the charge of the drum, one flange or end of the drum may be displaced outwardly from the other so as to increase the width between the flanges and thus relieve said side pressure during the act of rotating the barrel.

The invention is more particularly described with reference to the accompanying drawings which illustrate several forms of construction of drums by way of example and in which:

FIGURE 1 is a front view in elevation of a composite drum showing a different form of barrel at one side than the other, either of which forms of construction may be utilised in the construction of the barrel.

FIGURE 2 is a similar view of a modification.

FIGURE 3 is a side or end elevational view of the modification illustrated in FIGURE 2.

FIGURE 4 is a detail showing a roller on the end of one of a number of pegs extending radially from a barrel but nearer to the appropriate side flange than in the construction of FIGURE 2, the object of said rollers being to facilitate the rotation of the barrel when desired.

FIGURES 5 and 6 are details showing simple yet efficient means for increasing the space between the side flanges by displacing one flange axially outwardly relatively to the other, these figures showing one side flange in its inner and outer positions respectively.

FIGURE 7 is a detail showing one form of device for locking a side flange to the barrel when desired.

In the constructions illustrated in FIGURE 1 of the drawings a barrel 10 of steel or the like metal, or again of other rigid material such as wood, tapers inwardly from its rim or outer cylindrical periphery 11 to its inner tubular periphery 12 which is adapted to rotate about a hollow shaft or spindle 13 fixed to side or end flanges 14 of the drum or reel. Where the barrel 10 is of steel or other suitable metal it may have spokes 15 as shown which extend in an inclined direction between the outer periphery 11 and the inner periphery 12 acting as a hub, while the flanges shown generally at 14 may have three, four or more equidistantly spaced reinforcing gussets 16 which taper as shown in a direction radially outwardly between central shaft or spindle 13 and a short cylindrical plate 27 to which is fixed an annulus 28, which may be radially fluted in known manner such as for example as described and illustrated in the specification and drawings of British Patent No. 652,483.

Instead of being inclined to the axis of the shaft 13, however, the spokes 15 may extend radially at right angles to said axis in which event the gussets 16 may be appropriately shaped. Where the barrel is of wood it may have side or end walls between the spindle 13 and their outer periphery which are solid throughout instead of being made up of spokes with an outer fluted or other solid annulus.

Where it is possible for cable, rope, wire or the like, which is wound upon the outer periphery of the barrel 10, to exert a pressure on the side flanges 14, the barrel may be provided at both sides or ends with a false inner side or flange 17 (shown at the left hand end only in FIGURE 1).

In the construction illustrated in FIGURES 2 and 3 the false inner side or flange 17 is replaced by a plurality of radially extending pegs or spokes 18 which similarly prevent the application or side or bursting pressure by the cable, rope or other charge on the fluted or other solid annular outer part of the side flanges 14 which would tend to restrain easy rotation of the barrel. The inner ends of the pegs 18 are passed through holes in the periphery 11 of the barrel 10 and are either fixedly located in channel members 19 secured internally to the barrel or in holes in flat bars welded or otherwise rigidly secured to the said periphery 11 of the barrel 10 adjacent its ends. If desired the members 19 may be detachably connected to the periphery 11.

As may be seen from FIGURE 4 the pegs 18 may have rollers 20 at their outer ends for rolling engagement with the inner surfaces of rims 29, of U or other shape, which are mounted on the outer peripheries of the side flanges 14 of the drum, but if desired these rollers may be provided in the region of the rim 11 of the barrel.

Prevention of rotation of the barrel 10 on its central fixed shaft or spindle 13 may be effected when desired by the use of sliding keys 21 in keyways on the central spindle or by locking pins 22 which may extend between peripherally adjacent lugs 30, 31 mounted on the cylindrical plate 27 of the flanges 14 and on the channel 19 of the barrel 10 thereby converting the drum assembly of the present invention into a conventional or normal solid form during the act of loading or otherwise processing it.

A convenient form of scotching device for preventing rotation of the flanges when the barrel 10 is rotating during unwinding of the charge thereon, is shown in FIGURE 3 although it will be appreciated that it is equally applicable to the construction of drums illustrated in FIGURE 1. In such device scotches 24 are provided, the shanks 25 of which are displaceable in any desired manner within channelled or tubular elements 26 mounted externally on the yokes of spokes 32 of channel section of the flanges 14 to extend radially of the latter, said displacement of the scotches being between positions at which the shanks 25 are stowed away as shown in full lines in FIGURE 3, or extended for the scotches to become operative in preventing rotation of the flanges 14 as shown in dotted lines.

Where it is desired to assist rotation of the barrel by slightly displacing either side flange 14 axially of the other and thus increasing the width of the drum when the act of unwinding a cable or the like charge from the barrel 10 is required, a quick-action cam 33 in the form of a sleeve may be mounted loosely on the spindle 13 between a cap or head 34 on either or each end thereof and a cam face 35 on a hub 36 of the or each side flange to be axially displaced, angular displacement of the cam 33 relative to the hub 36 to cause axial displacement of the flange 14 from the contracted position shown in FIGURE 6 to the outwardly displaced position shown in FIGURE 5 being effected by the use of a manually operated tommy bar adapted for insertion in a radial hole 37 of the cam 33.

Alternatively the sleeve instead of having a quick-action cam 33 may be screw threaded so that on rotation it may be axially displaced to effect the required increase or decrease, as the case may be, in the space between the side flanges 14.

The drums may be provided with a lagging or protective battening (not shown) after loading with a cable, wire or rope has been completed, and in this respect it will be appreciated that with the present invention a considerable saving in both cost and time is achieved by the present invention in that unloading of the cable, wire or rope may be effected solely after removal of a portion only, as distinct from the whole, of said lagging or battening.

In the foregoing the invention has been described with reference to a specific illustrative device. It will be evident, however, that variations and modifications may be made without departing from the broader scope and spirit of the invention as set forth in the appended claims. The specification and drawings are accordingly to be regarded in an illustrative rather than in a restrictive sense.

I claim:
1. A drum for cables comprising an axle, a pair of flanges mounted on the opposite ends of said axle so as to lie in parallel, spaced apart vertical planes and having circular peripheries for rolling on the ground, a barrel disposed coaxially between said flanges and mounted on said axle for free rotation with respect to both of said flanges, said barrel having a continuous cylindrical surface extending to the ends thereof and of an outer diameter less than that of said flanges so that the flanges and said cylindrical surface cooperate to define an annular cable receiving space, and means for adjusting the axial distance between said flanges so that, after a cable is wound on said barrel and retained axially by said flanges, the distance between said flanges can be increased to free the flanges from the wound cable and thereby facilitate turning of the barrel relative to the flanges during unwinding of cable from the barrel while said flanges rest immobile on the ground.

2. A drum for cables comprising an axle, a pair of flanges mounted on the opposite ends of said axle so as to lie in parallel, spaced apart vertical planes and having circular peripheries for rolling on the ground, a barrel having a continuous cylindrical surface extending to the ends thereof and of an outer diameter less than that of said flanges, said barrel being disposed coaxially between said flanges and mounted on said axle for free rotation with respect to both of said flanges, caps on the ends of said axle, a hub on at least one of said flanges having a cam surface at the axial side thereof facing toward the adjacent cap, and a cam ring turnable on said axle between said cam surface and said adjacent cap to increase and decrease the axial distance between said flanges in response to turning of said cam ring relative to the axle so that, after a cable is wound on said barrel and retained axially by said flanges, the distance between the flanges can be increased to free the flanges from the wound cable and thereby facilitate turning of the barrel relative to the flanges during unwinding of cable from the barrel while said flanges rest immobile on the ground.

References Cited by the Examiner

UNITED STATES PATENTS

| | | | |
|---|---|---|---|
| 743,830 | 11/03 | Clark | 242—71.9 |
| 818,990 | 4/06 | Wirt et al. | 242—94 X |
| 951,718 | 3/10 | Arnsdorff | 242—86.52 |
| 1,136,577 | 4/15 | Ahlstrom | 242—71.9 |
| 1,661,991 | 3/28 | Benit | 242—94 |
| 1,726,137 | 8/29 | Bernal | 242—94 X |
| 1,820,693 | 8/31 | Dreisbach | 242—73 |
| 2,182,936 | 12/39 | Whittaker | 242—77.4 |
| 2,199,901 | 5/40 | Whitaker | 242—94 X |
| 2,452,378 | 10/48 | Hudson | 242—77.4 |
| 2,757,880 | 8/56 | De LaMotte | 242—78.7 |

FOREIGN PATENTS

| | | |
|---|---|---|
| 487,800 | 12/29 | Germany. |
| 286,859 | 3/28 | Great Britain. |
| 353,684 | 7/31 | Great Britain. |
| 218,450 | 6/42 | Switzerland. |

MERVIN STEIN, *Primary Examiner.*

RUSSELL C. MADER, *Examiner.*